US005921019A

United States Patent [19]
Baek

[11] Patent Number: 5,921,019
[45] Date of Patent: *Jul. 13, 1999

[54] SPRAYING OF INSECTICIDES, HERBICIDES, OILS AND LIQUID FERTILIZERS FOR HORTICULTURAL AND AGRICULTURAL APPLICATIONS

[76] Inventor: Bent Baek, 66 Henry Street, West Croydon, SA 5008, Australia

[ * ] Notice: This patent issued on a continued prosecution application filed under 37 CFR 1.53(d), and is subject to the twenty year patent term provisions of 35 U.S.C. 154(a)(2).

[21] Appl. No.: 08/809,398
[22] PCT Filed: Aug. 2, 1996
[86] PCT No.: PCT/AU96/00487
§ 371 Date: Mar. 21, 1997
§ 102(e) Date: Mar. 21, 1997
[87] PCT Pub. No.: WO97/04879
PCT Pub. Date: Feb. 13, 1997

[30] Foreign Application Priority Data

Aug. 2, 1995 [AU] Australia ............................... PN 4538

[51] Int. Cl.⁶ ...................................................... B05B 9/03
[52] U.S. Cl. ................................................ 47/1.7; 239/77
[58] Field of Search ............................... 47/1.7, DIG. 11; 239/77, 78

[56] References Cited

U.S. PATENT DOCUMENTS 3,489,351  1/1970  Patterson .................................... 239/77
3,655,130  4/1972  Patrick ....................................... 239/77

(List continued on next page.)

FOREIGN PATENT DOCUMENTS

40665/95  12/1995  Australia .
0 353132  1/1990  European Pat. Off. .

(List continued on next page.)

OTHER PUBLICATIONS

"Span Spray Makes Debut in California Vineyards", The American Fruit Grower, 1971.

"Tunnel Sprayer for Dwarf Fruit Trees", by D.L. Peterson and H.W. Hogmire, Transactions of the ASAE, 1994 The American Society of Agricultural Engineers.

*Primary Examiner*—J. Woodrow Eldred
*Attorney, Agent, or Firm*—Watts, Hoffmann, Fisher & Heinke Co., L.P.A.

[57] ABSTRACT

Grower experience, with poor disease control of grape vines has suggested that, despite overspraying, actual spray coverage was poor, failing to penetrate the dense outer foliage, so that parts of the tree, particularly the top, were inadequately sprayed. Consequently, there was a requirement to ensure that spraying materials were deposited more efficiently and effectively upon targeted foliage, thereby reducing the volume of liquid carrier and therefore the amount of chemical required for a particular crop. This problem has been overcome by directing two fan-driven spray units (14) upward and into the foliage canopy, so as to displace the leaves in upward and outward directions, in co-operation with at least one further spray unit (16) downwardly directed, so as to spray into and partly through the canopy. The spray units are mounted on an inverted U-frame (21), which in turn is mounted on a mobile chassis or tractor (10) for transport through the crop area. For preference, two upper spray units (16) are employed, with a further option for a fifth spray unit (17), adjacent the apex (22) of the inverted U-frame (21). Multiple frames (21) may also be exploited, by suspension from an overhead boom (12). The operation is enhanced by automatic sensing and control, regulating the distance of the spray units (15, 16, 17) from the canopy, adjusting the spray rate to the canopy volume, the surface area of the leaves and produce, careful adjustment of the positions and directions of the spray units (15, 16, 17), and relating the speed of the spraying equipment to the volume of liquid sprayed. Liquids sprayed include insecticides, herbicides, oils and fertilisers.

18 Claims, 15 Drawing Sheets

U.S. PATENT DOCUMENTS

| | | | |
|---|---|---|---|
| 4,439,948 | 4/1984 | Brown et al. | 47/1.7 |
| 5,028,002 | 7/1991 | Whitford | 239/8 |
| 5,172,861 | 12/1992 | Lenhart | 239/78 |
| 5,278,423 | 1/1994 | Wangler et al. | 250/561 |
| 5,372,305 | 12/1994 | Ballu | 239/77 |

FOREIGN PATENT DOCUMENTS

| | | |
|---|---|---|
| 0 382885 | 8/1990 | European Pat. Off. . |
| 3404760 | 8/1985 | Germany . |
| 3785 18 | 5/1989 | Germany . |
| 3901 463 | 7/1990 | Germany . |
| 93/20688 | 10/1993 | WIPO . |

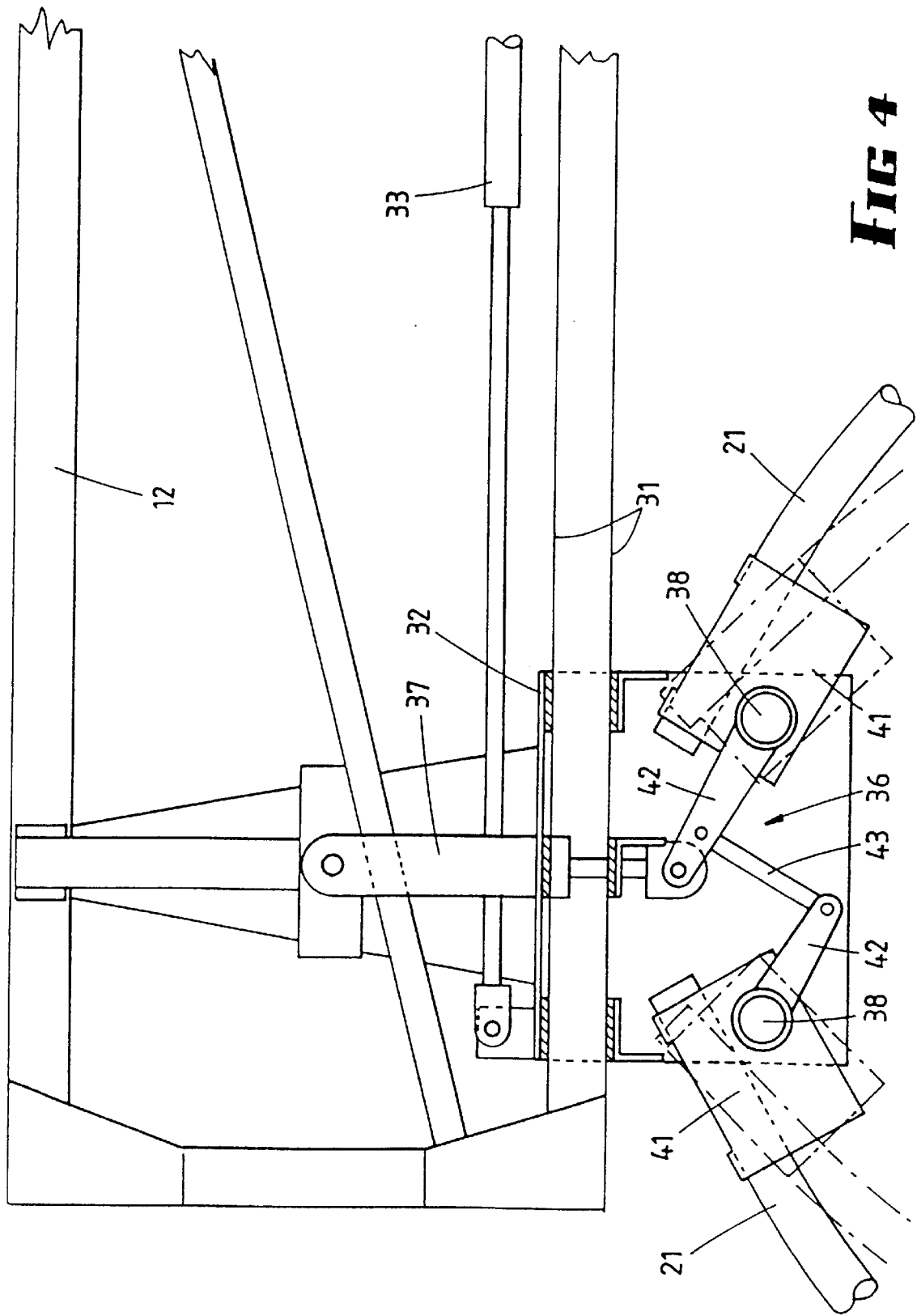

SPRAYING OF INSECTICIDES, HERBICIDES, OILS AND LIQUID FERTILIZERS FOR HORTICULTURAL AND AGRICULTURAL APPLICATIONS

This invention relates both to a spray method and also to spray means, useful for spraying insecticides, herbicides, oils and liquid fertilisers for horticultural and agricultural applications.

Generally the spraying rates of insecticides, herbicides and liquid fertilisers are determined by unit area of land on which it is applied (for example liters per hectare). These rates are normally recommended by the manufacturers.

Due to different soil types and qualities, however, the number of plants, vines and/or fruit trees etc per hectare can significantly vary. The variation in the number of plants per hectare is generally effected by altering the row spacing between rows of plants. Ideally therefore the spraying rates should be determined by the number of plants per hectare and/or the plant canopy sizes and/or volumes and/or the leaf and produce surface area.

Tests are referred to hereunder however which refer to the number of liters per hectare in accordance with convention, but this invention seeks amongst other things to provide a spraying method wherein the size of a canopy of a plant, more particularly a grape vine, can be determined, for two reasons, firstly that the spray heads are maintained at an optimum distance away from foliage and secondly that the spray rate needs to be varied and increased for large canopies, quite independently from the number of hectares. In order to achieve this, there is disclosed in this specification a concept wherein optical or sonar sensors can continuously measure canopy size, and means whereby the spraying pressure can be regulated so that the spraying flow rate can be proportional to the canopy size, reckoned as volume.

One of the most disturbing aspects of spraying, as currently conducted in agriculture, is the excessive use of insecticides, herbicides and other chemicals. This has been recognised in environmental regulations, and policies are being enforced worldwide in order to minimise water and soil contamination due to off target spray losses. This invention therefore has as a main object the provision of means and methods whereby there is less overspray and therefore less usage of chemicals than heretofore, resulting not only in an environmental saving but also a very considerable saving in expense.

In one typical embodiment, use is made of a pair of curved arms of pincer-like or horseshoe shape, hinged above the canopy and extending downwardly over each side. Desirably the arms are angled at hinge points above the canopy, and fan spraying heads are mounted on the arms which can be adjusted up or down, the arms and also rotated to blow into the canopy at a desired angle, both backward and forward with respect to direction of travel and also up and down. This particular configuration of arms was arrived at after many experiments and was chosen for its simplicity of control. A pincer or horseshoe arrangement has the inherent advantage that adjustments to the extension of the pincer results in an approximately equidistant movement of spray heads attached to the arms from the foliage at most points along the arms. As a result, this particular configuration maintains the required distance between the foliage and the spray heads for most canopy cross sectional shapes. This aspect was noted by the Applicant as being an opportunity to implement this arrangement for spraying which would result in an extremely simplified control mechanism as compared with the prior art. The simplified control mechanism for adjusting the spray heads for different sized canopies of foliage results in a significant cost saving in the provision of an adjustable spraying system as compared with the prior art.

PRIOR ART

Applicant has made extensive searches of both Australian and overseas databanks but very little has been disclosed by those searches which is relevant to the present invention. By far the closest reference was the Australian Patent Application 40665/95 in the name of Technion Research and Development Foundation Ltd of Israel, the inventor being Gedalyahu Manor and Amos Geva. The reader's attention is drawn to FIG. 14 of the drawings of that specification wherein spray was imparted over the top, sides and partially into the interior of the canopy, and on page 9, second full paragraph, there is a brief description of how "the flexible duct can be bent into various shapes around the contour of the respective tree or plant".

However, the closest prior art which has been discovered by the Applicant is a report in the Journal of Agricultural Engineering (1985 32, 291–310). There was a report in the 1985 British Society for Research in Agricultural Engineering and the report was from the Department of Agriculture, Research Centre, PO Box 411, Loxton, South Australia 5333. A contributor to the work was Geoffrey O. Furness, and they reported having achieved a spray coverage with a multi-head sprayer at 650 liters per hectare using converging air jets as compared with regard to uniformity of coverage only, with that from an oscillating boom at 10,000 liters per hectare and that from an air blaster 8,000 liters per hectare, using a percentage spray cover rating system. With a multi-head sprayer, almost 90% of the upper and 50% of the under leaf surfaces has a droplet number of 500 per $cm^2$ or greater.

This report was based on grower experience with poor disease control of grape vines suggesting that spray coverage was poor, particularly in the centre of a vine. The report cited with approval a report by Messrs Carman and Jebbson wherein they suggested that "the spray penetrates the dense outer foliage poorly, and, as a result, parts of the tree, particularly the tree top, are inadequately sprayed". Mr Furness observed that "the air blaster is essentially unidirectional, causing leaves to bend back against one another, thereby creating a wall of foliage not readily penetrated by the spray stream". The report included a reference to the development of a simple sprayer which moves large volumes of air and eliminates the unidirectional, rapidly diverging nature of air stream generated by an air blast sprayer, and thereby provides a considerable improvement in sprayer performance. The sprayer reported was a multihead machine which allowed air convergence onto the target and had the important effect of increasing the level of turbulence. For the spraying of grapevines, Mr Furness disclosed the use of two heads converging in a vertical plane with the lower head aimed 45° upwards and the upper head aimed at 45° downwards from above the vine. The spray was directed straight at the vine, that is at 90° of the direction of the vine row.

Although the Furness development reduced the spray requirements by a factor exceeding 10, air blast sprayers and "turbo miser" sprayers are still the most commonly used sprayers for grape vines in Australia.

The main object of this invention is to still further improve the efficiency of agricultural spraying such that spray materials are more efficiently and effectively deposited upon targeted foliage. This has the resultant effect of reducing the volume of liquid carrier required for spraying and also reduces the amount of chemical required for a particular crop as compared with the prior art methods. In a report on a prototype which preceded this invention as now developed and described herein, but was produced by the Applicant, the University of South Australia indicated that for medium to dense foliage canopies of grape vines, the liquid quantity required using that prototype to give a 95% effective coverage was less than 100 liters per hectare. This of course is achieved in this invention as it was in the prototype by reducing overspray, and that in turn has been achieved by displacing the air in the space within a canopy with two air streams entraining the sprayed materials and entering the canopy from opposite sides, and simultaneously or very quickly thereafter, spraying the outer surface of the canopy with further air streams entraining further quantities of spraying materials. This arrangement appears to limit overspray to a negligible level.

There are however a number of other matters which require careful consideration to achieve such results and they include:

a) a need to regulate distance of the fan from the canopy, and that in turn to some extent will depend on the canopy wherein shapes and sizes vary with different species;

b) automatically adjusting the spray rate according to canopy volume;

c) careful adjustment of the positions and directions of the spray heads;

d) relating the speed of the spraying equipment to the volume of the liquid which is being sprayed; and e) adjustment of the spraying rate according to the surface area of the leaf and produce to be sprayed.

The above-referred to achievement of less than 100 liters per hectare was achieved with an over row tractor spraying a row of grape vines at approximately 9 km/h. Whilst the achievements of this invention have been measured during spraying operations involving grape vines, it should be noted that the invention contained herein and its consequent advantages are equally applicable to other crops including citrus, stone fruit, apple and pear crops and even cotton crops. Virtually any type of crop which is farmed in rows can take advantage of the improved efficiency of spraying made available by this invention. In addition, it should also be noted that the improved spray distribution resulting from this invention also results in the increased viability of using oils as carriers during spraying operations. Oils are sometimes used as a carrier during spraying operations for their inherent advantage of remaining upon foliage even if the foliage is subjected to rain soon after spraying. The improved effectiveness in applying materials to target foliage evenly and on both sides of the leaf increases the viability of greater use of oil carriers as compared with prior art spraying systems.

BRIEF SUMMARY OF THE INVENTION

In this invention the method of spraying a plant having a foliage canopy includes spraying with two lower sprays up into the space within the canopy, the lower sprays being located at each side of the canopy, spraying with two upper sprays downwardly over the outside of the canopy, and spraying with a fifth spray directly over the centre of the canopy but rearwardly of the other spray heads, all sprays being associated with air streams imparted by an impeller or impellers, and traversing the spray equipment over the canopy.

The equipment for the spraying requires a mobile frame which is fastened to an over row tractor, and having two upwardly directed spray heads which direct an air flow and entrained spray upwardly into the space within the canopy, two downwardly directed spray heads which direct an air stream and entrained spray over the sides of the canopy and a fifth spray head which directs spray downwardly over the top of the canopy, the air streams having sufficient force and flow rate to displace air from within the canopy, and all air streams being directed towards a space within the canopy, thereby converging and co-acting with one another to provide a high degree of turbulence which however is contained within, or very close to, the outer surface of the canopy.

As previously mentioned, the preferred configuration for the arms of the spraying equipment is a horseshoe or pincer arrangement. This configuration enables the spraying assembly to be adjusted for varying sized canopies with an extremely simple adjustment mechanism as compared with the prior art. This mechanism may be adjusted by hand or may be included as part of an automatic control system comprising a foliage detection means to enable automatic and controlled adjustment of the spraying arms, and hence the distance between the spray heads and the foliage to be sprayed. Additionally, the adjustment mechanism may be implemented by various means. In the preferred embodiment the adjustment means for the pincer arrangement of spraying arms comprises a piston/cylinder assembly, however this could equally be effected by an arrangement of intermeshing gears or some other similar mechanism whilst retaining its simplicity of control.

BRIEF DESCRIPTION OF THE PREFERRED EMBODIMENT

The preferred embodiment is described with reference to and is illustrated in the accompanying drawings in which:

FIG. 2c is a section taken on line 2c—2c of FIG. 2a.

FIG. 4 is a fragmentary view which illustrates the suspension of a spraying sub-assembly from the mobile frame shown best in FIG. 3;

FIG. 5b is a section taken on line 5b—5b of FIG. 5a.

Figure 7:
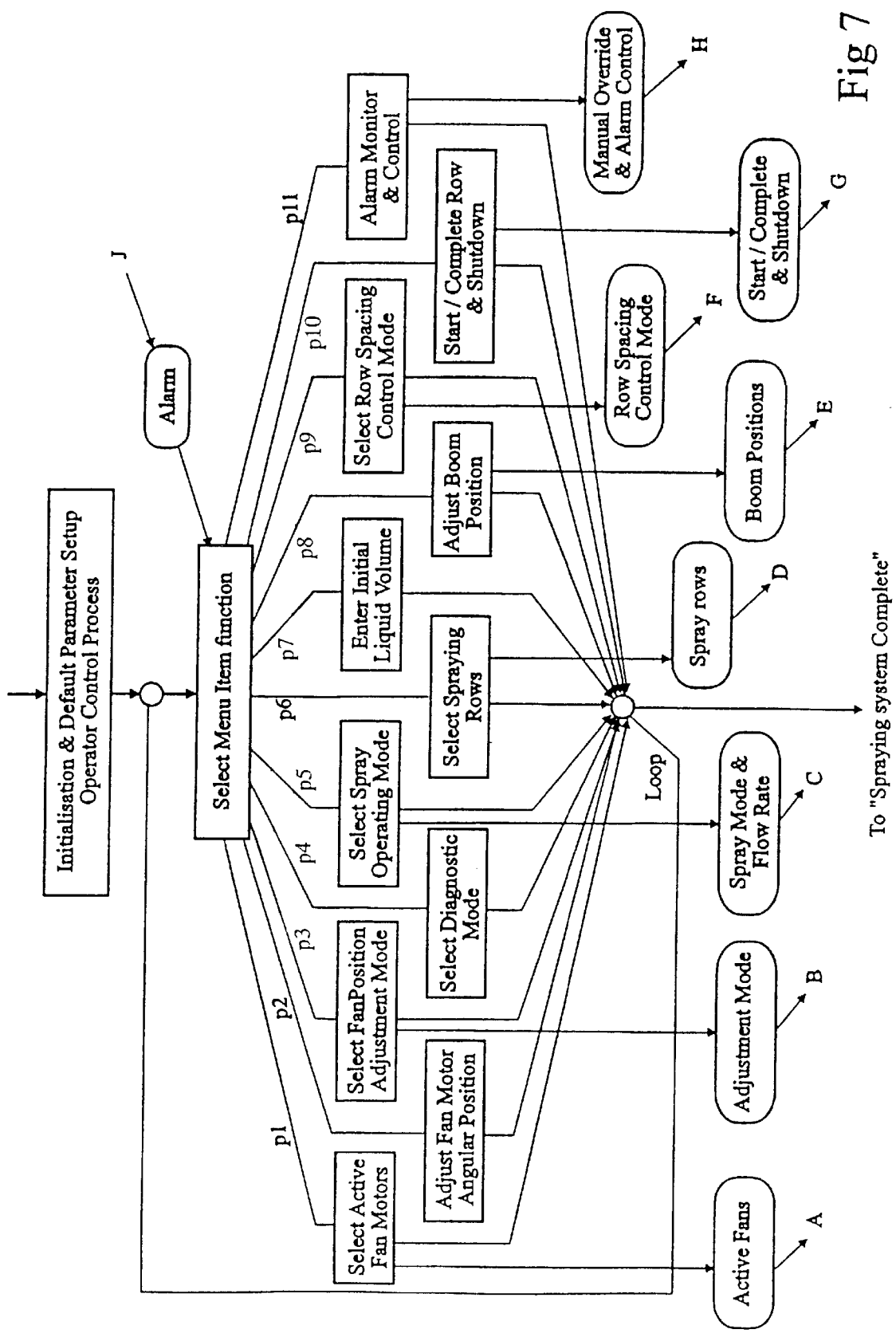

FIG. 7 describes the Operator Control Process

Figure 8:
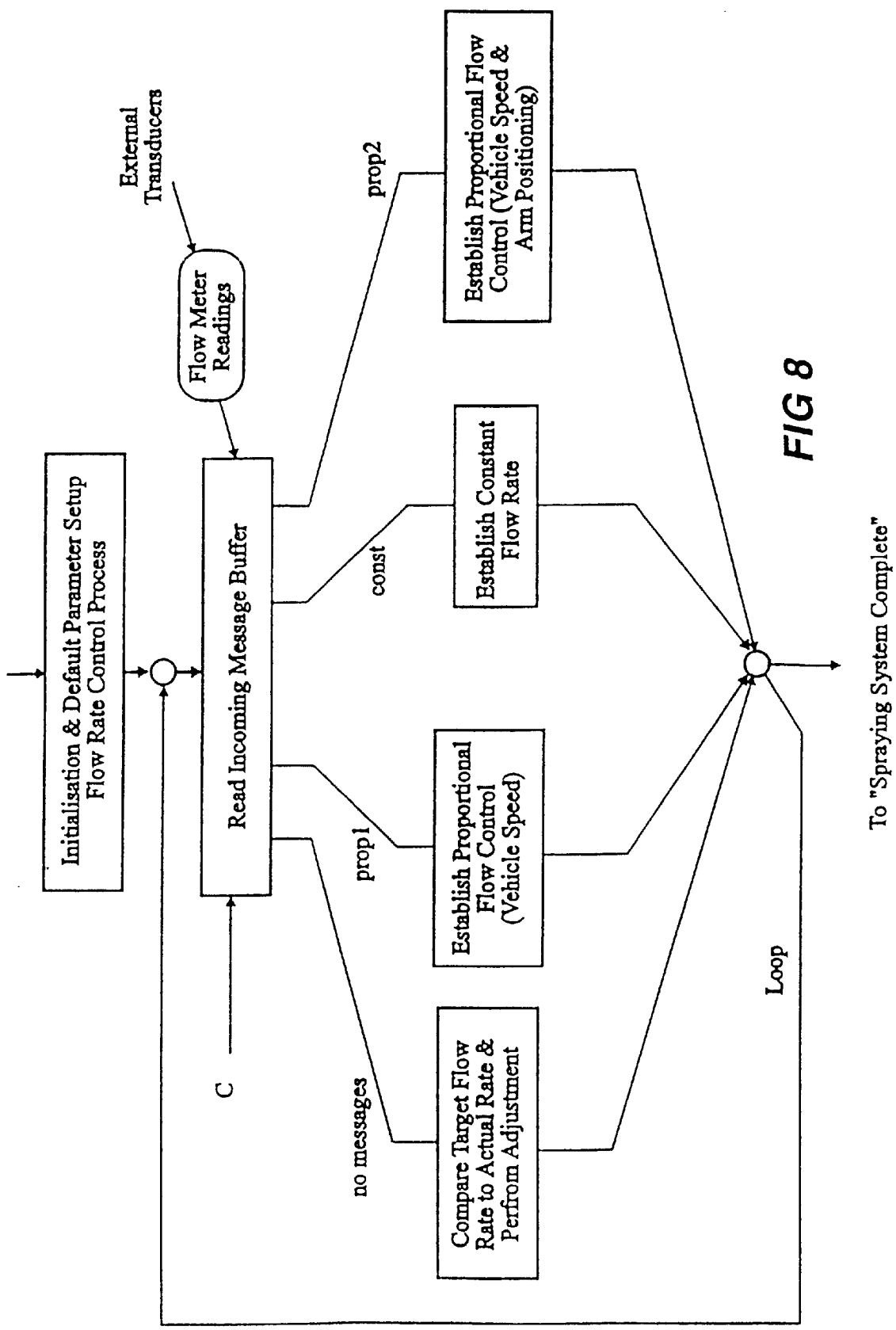

FIG. 8 describes the Flow Rate Control Process

Figure 9:
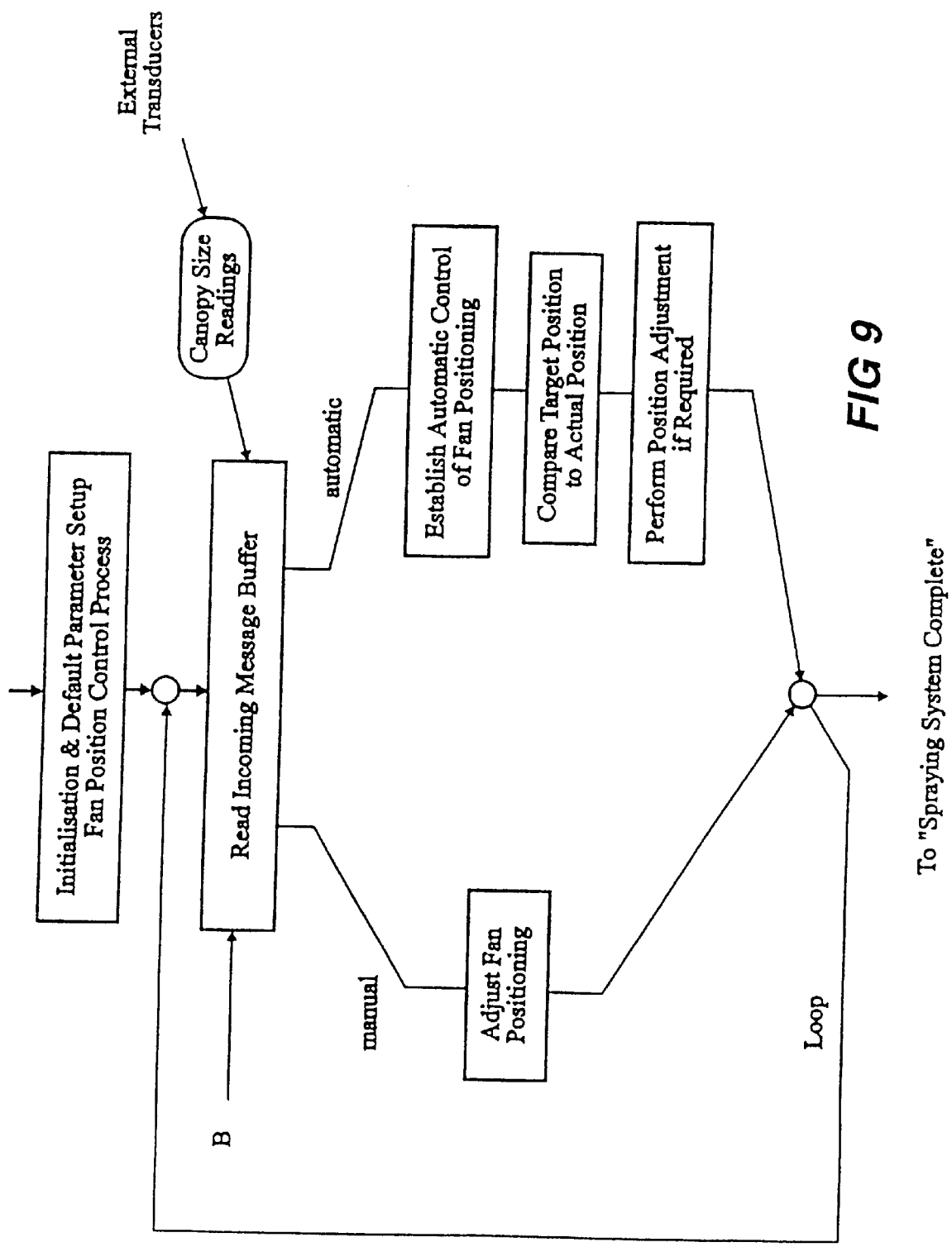

FIG. 9 describes the Fan Position Control Process

Figure 10:
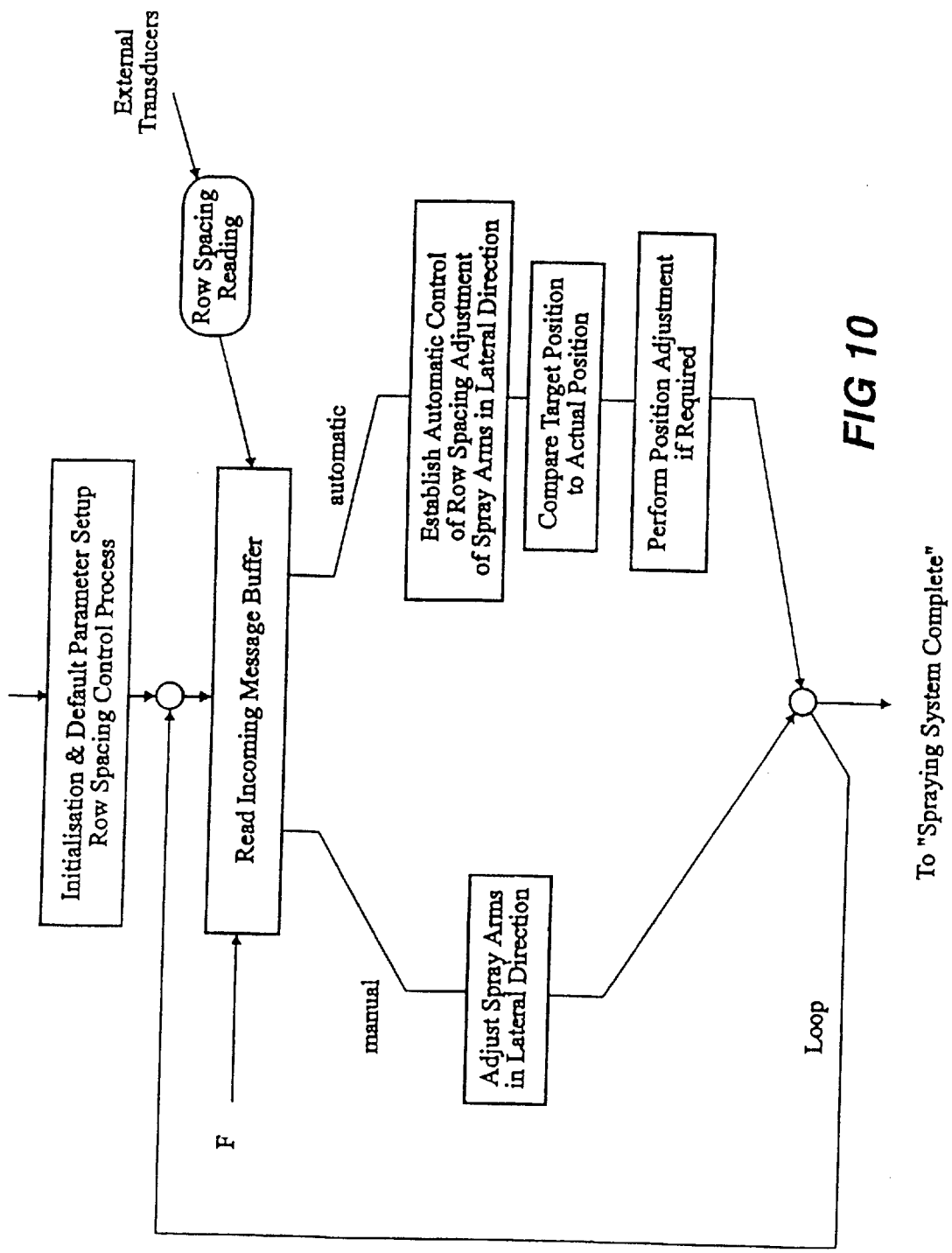

FIG. 10 describes the Row Spacing Control Process

Figure 11:
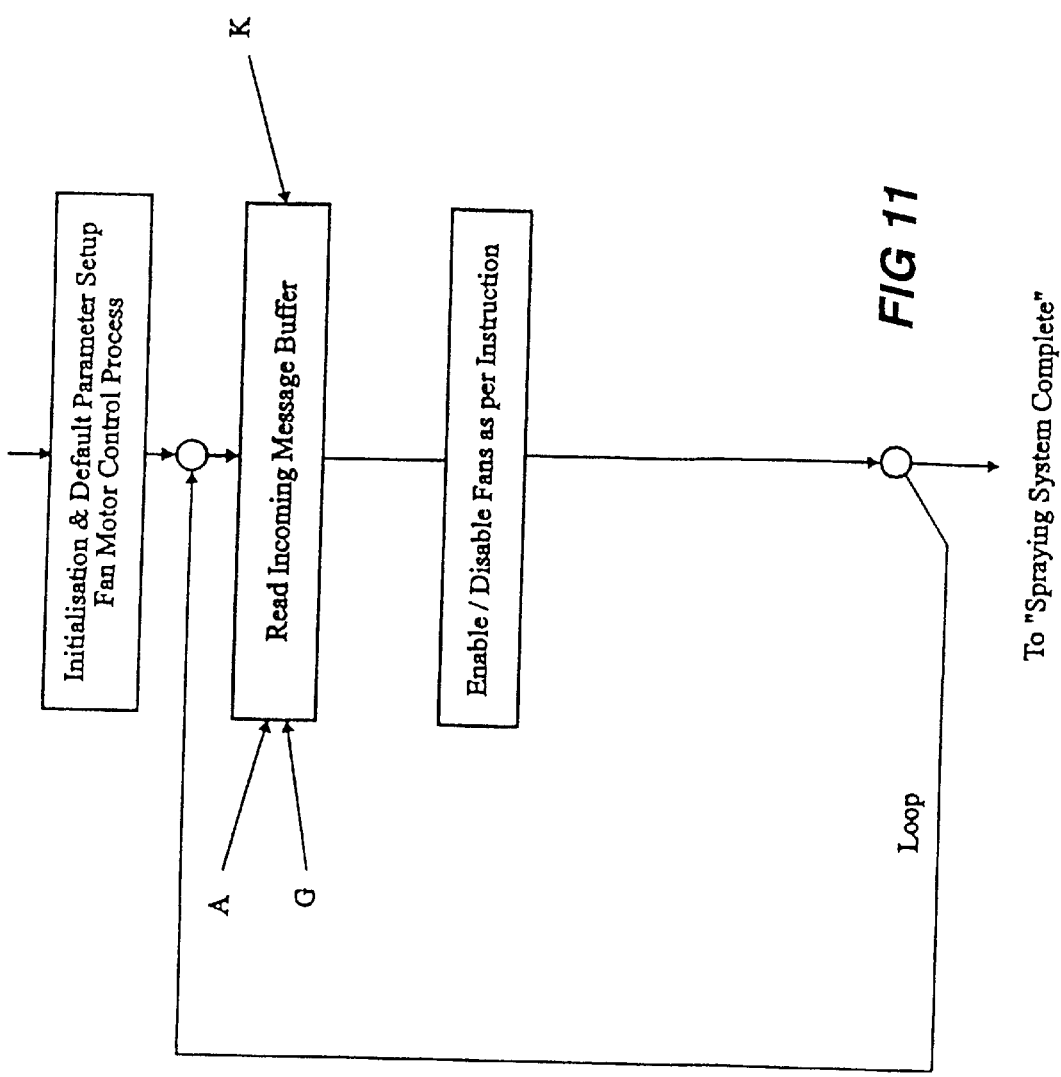

FIG. 11 describes the Fan Motor Control Process

Figure 12:
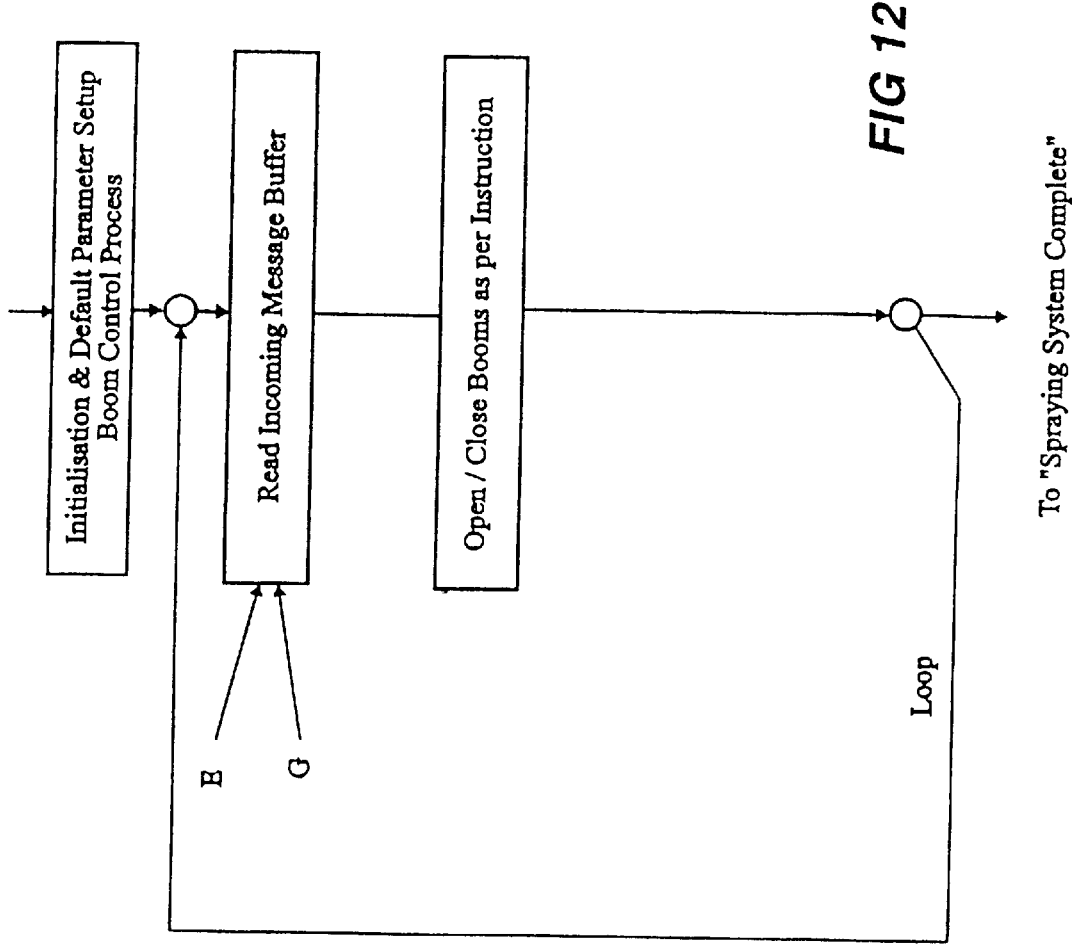

FIG. 12 describes the Boom Control Process

Figure 13:
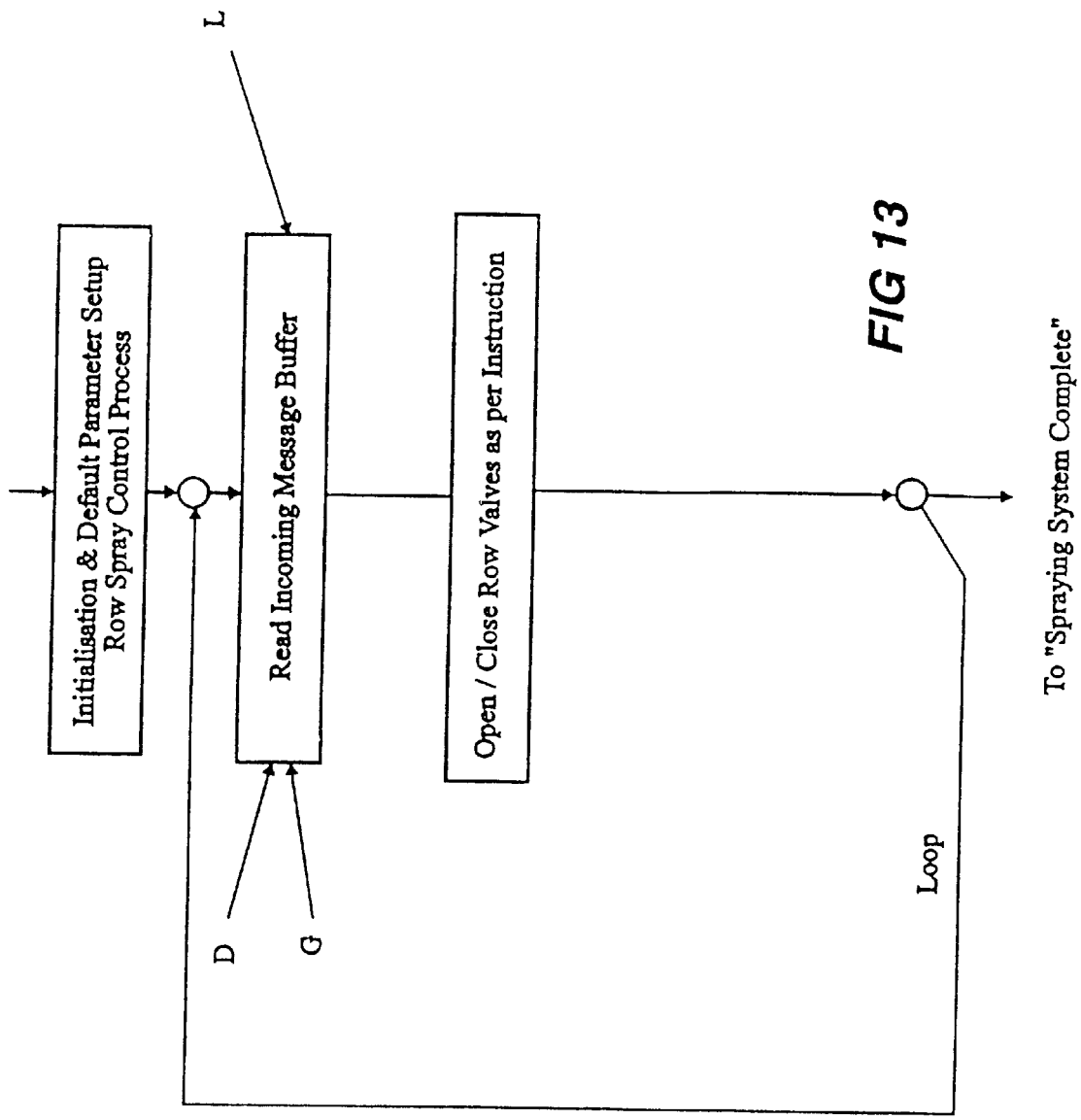

FIG. 13 describes the Row Spray Control Process

Figure 14:
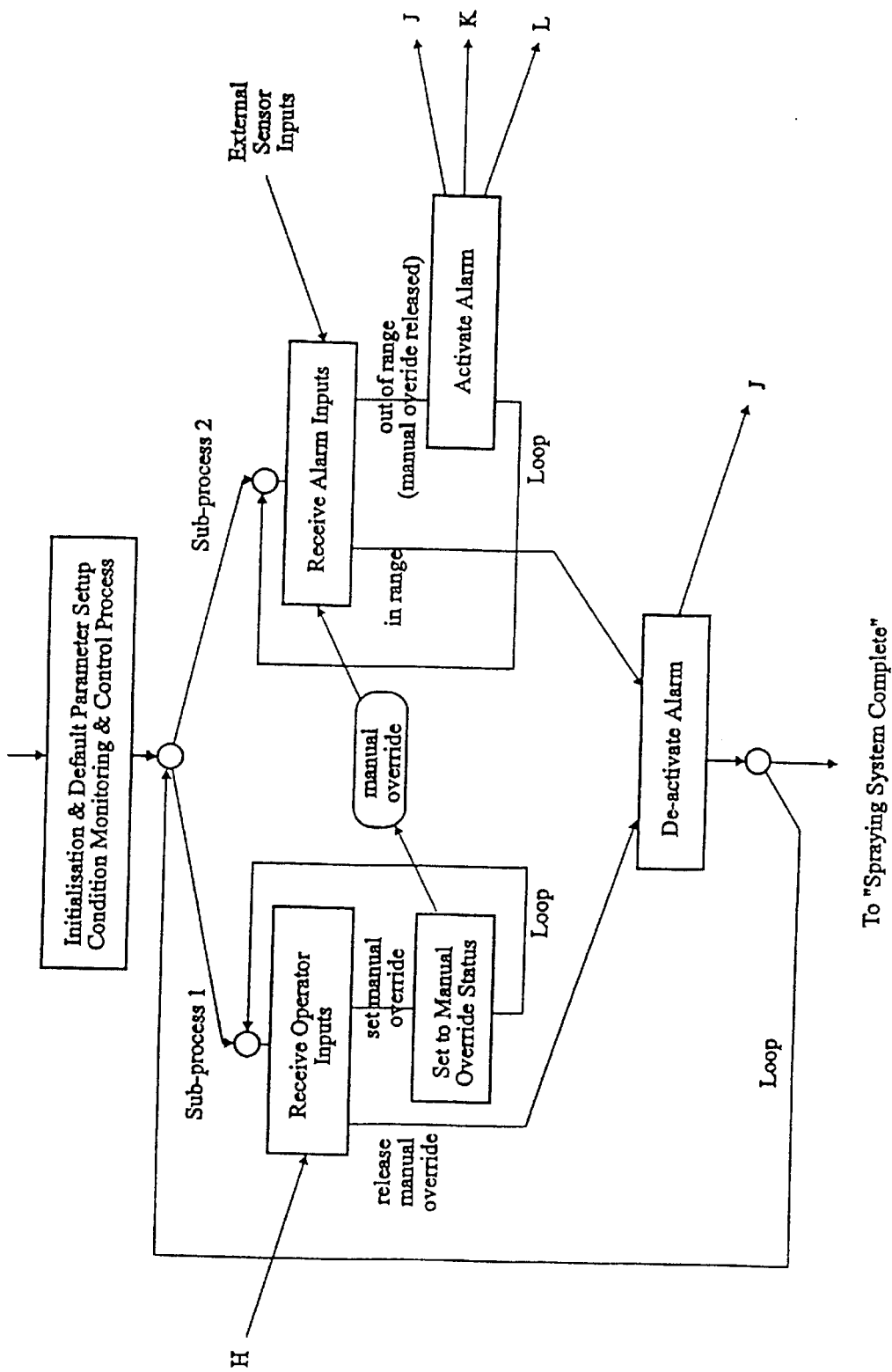

FIG. 14 describes the condition Monitoring & Control Process.

Figure 1:
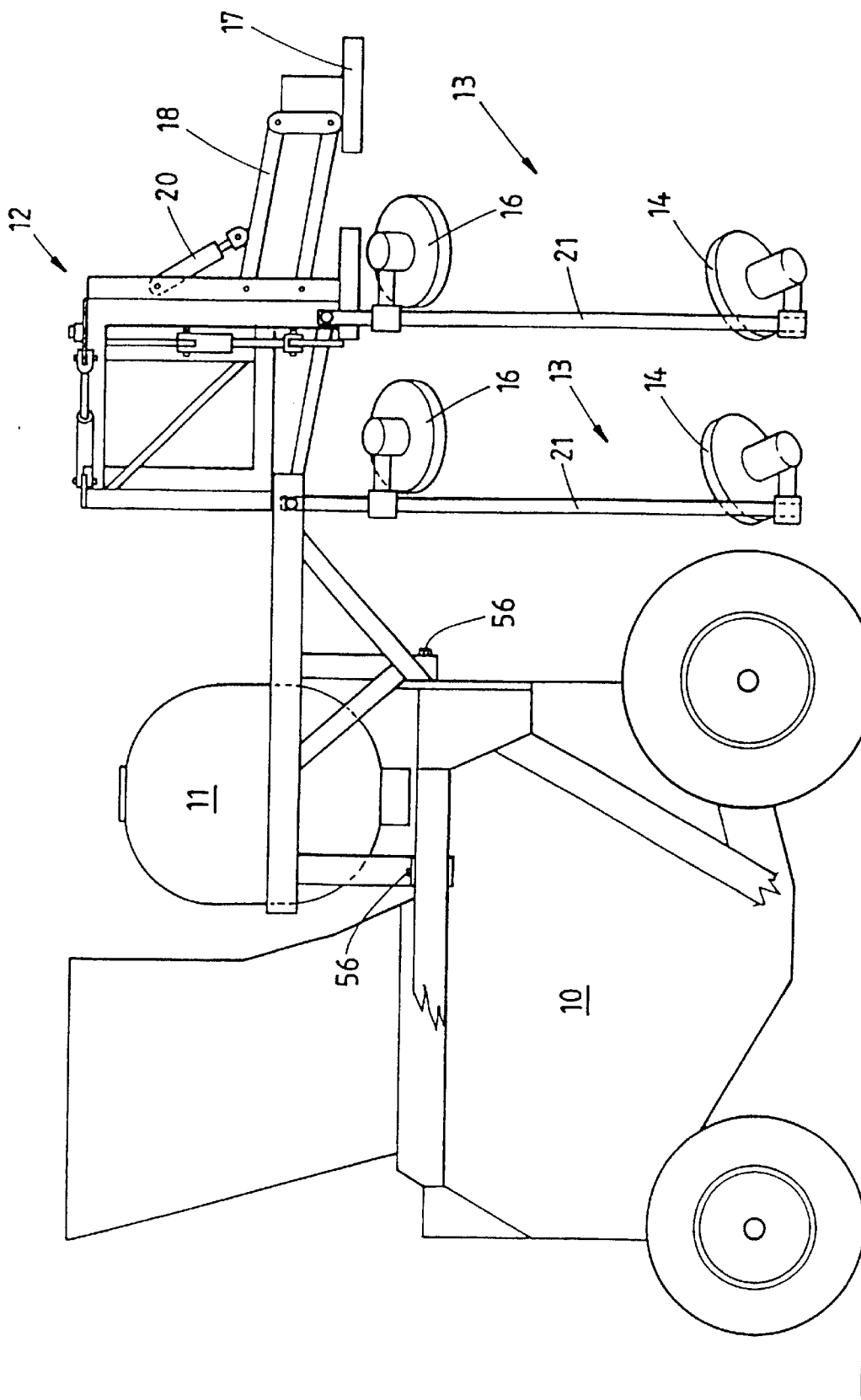
FIG. 1 is a diagrammatic side elevation of an over row tractor provided with a plurality of spray heads carried on a mobile frame which is affixed to the over row tractor.

Reference is made first to FIG. 1 which shows an over row tractor 10 as usually employed for pruning or harvesting a row of grape vines, and having on it a container 11 of materials to be sprayed over a row of grape vines. A mobile frame 12 is carried on the over row tractor, and FIG. 1 illustrates how the mobile frame 12 can carry on it a plurality of spraying sub-assemblies 13, two being seen in FIG. 1 one behind the other, this being necessary because when this invention is used on crops with either narrow raw spacings or large canopies, the spraying sub-assemblies 13 will overlap and hence they need to be staggered if three rows of grape vines are to be sprayed simultaneously. As seen also in FIG. 1, each frame sub-assembly also includes two side upper spray heads 16 and one central upper spray head 17 carried on arms 18.

Vertical movement of the entire spraying sub-assemblies 13 is achieved by inbuilt hydraulics on the over row tractor 10, and further hydraulic cylinders are used for other functions, for example FIG. 1 showing a hydraulic piston/ cylinder assembly 20 which will raise or lower the central upper spray head 17.

Figure 2A:
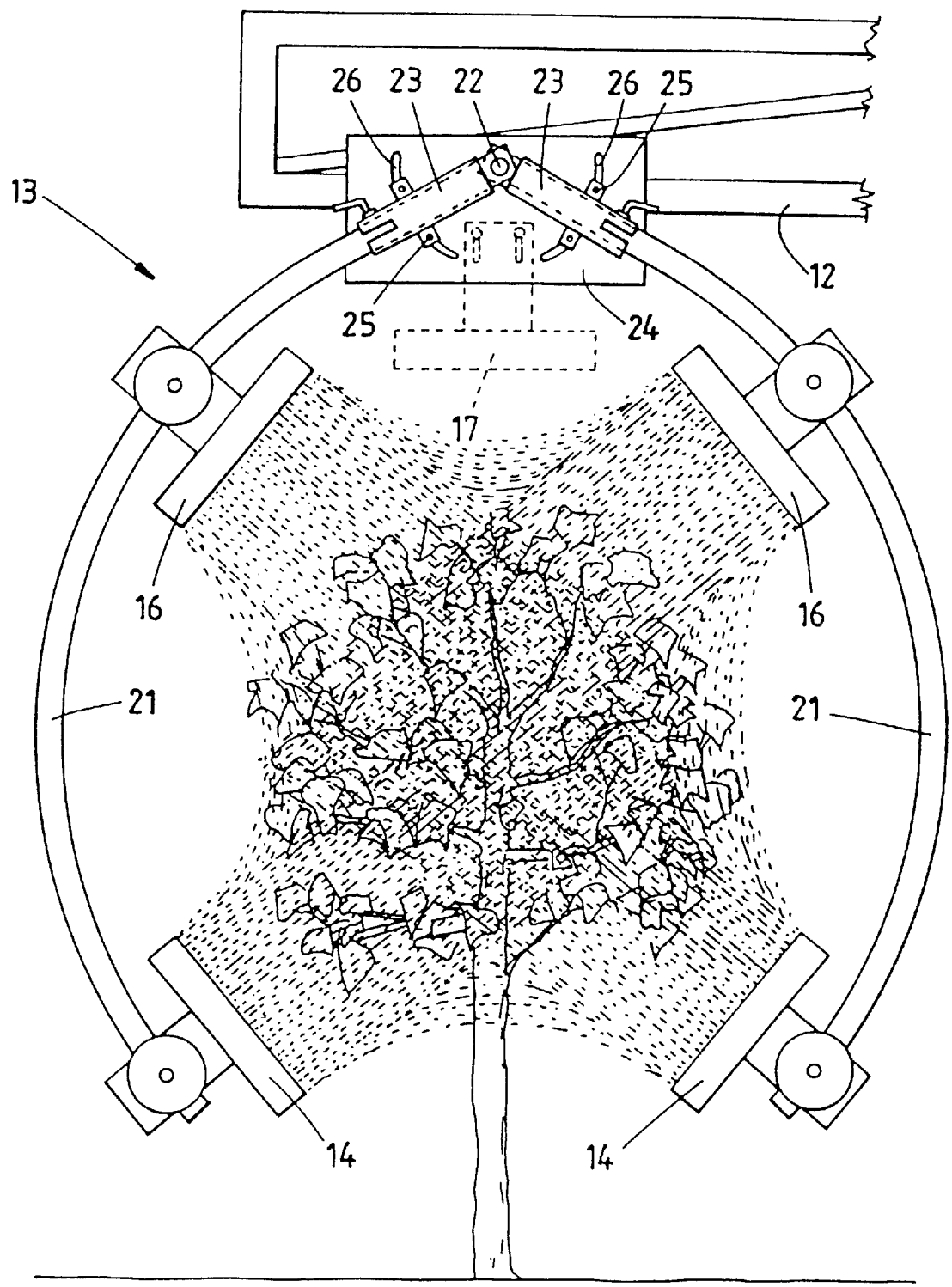
FIG. 2a shows a basic form of spraying sub-assembly for one full plant row wherein all adjustments are made by hand.

FIG. 2a illustrates a very basic type of spraying sub-assembly 13 wherein all adjustments are made by hand. There are two arms 21 of circular section tubing which are shown pivoted about a single pivot 22, and the space apart of the lower spray heads 14 is achieved by clamping the outer sleeves 23 to a base plate 24 to fasten the sleeves 23 adjustably for position, by bolts 25 being movable in arcuate slots 26. The central spray head 17 is shown only in dashed lines because quite reasonable results can be achieved with the arrangements shown, although those results do not compare with the results which are achieved with the preferred embodiment which is illustrated more particularly in the remaining drawings.

Whilst a high level of flexibility is achieved by the adjustment of the spray heads 14 and 16 towards and away from the canopy 35, a further adjustment is still required.

Figure 2C:
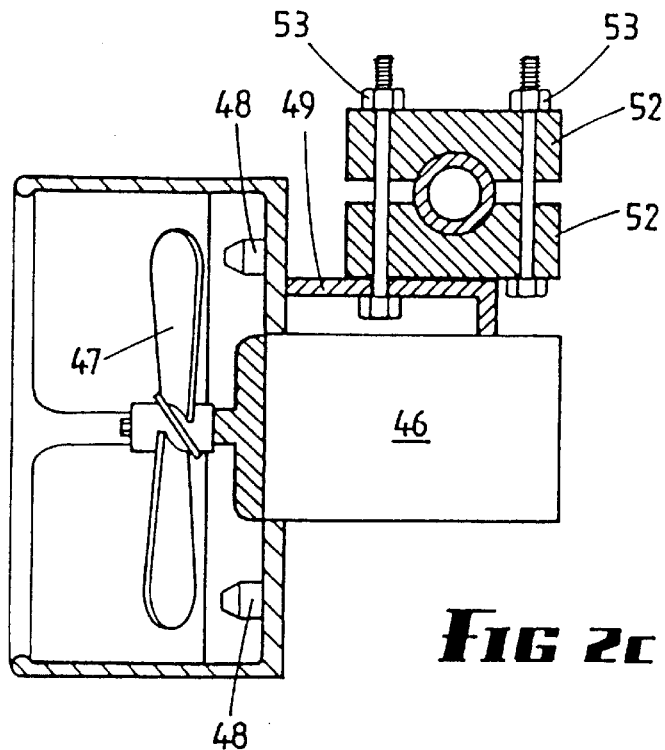
Figure 2B:
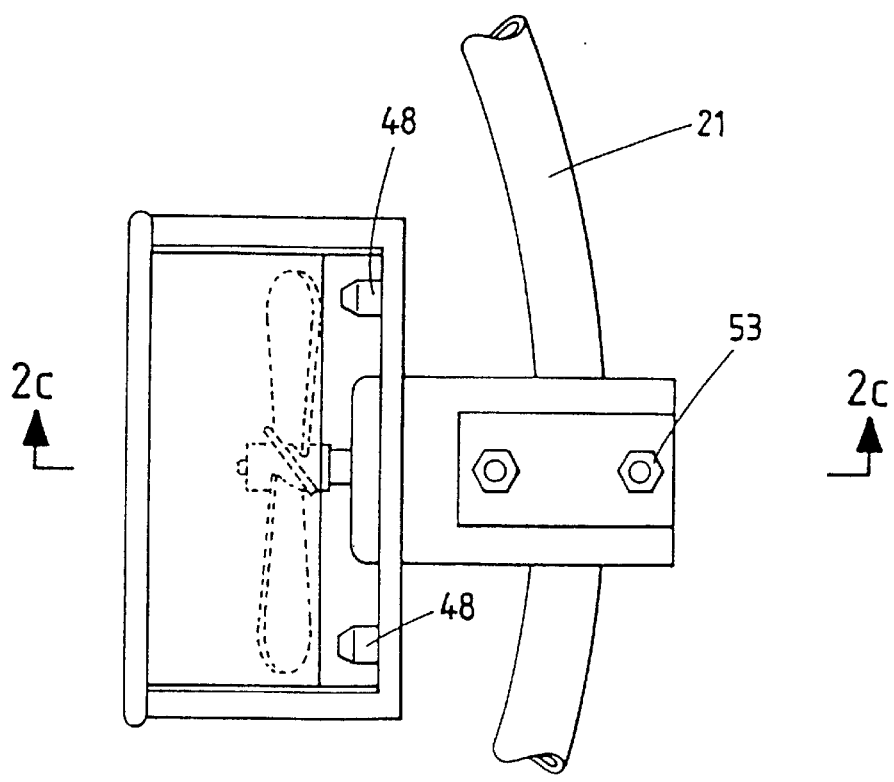
FIG. 2b is a fragmentary side elevation of a lower spray head illustrating a swivel clamp adjustment of the spray head.

FIGS. 2b and 2c illustrate a basic swivel clamp arrangement for a spray head mounted on an arm 21. The spray head comprises an electric motor 46 which is directly coupled to a fan 47. The fan 47 induces a flow of air which in turn entrains spray from nozzles 48. A further adjustment is required to vary the direction of air and spray impelled by fan 47. This is achieved by the swivel clamp 49 and 52 and adjustment is effected by loosening the nuts 53, repositioning the spray head and tightening the bolts 53. This enables the spray heads be adjusted to the desired angle in relation to the foliage and the direction of travel.

Figure 3:
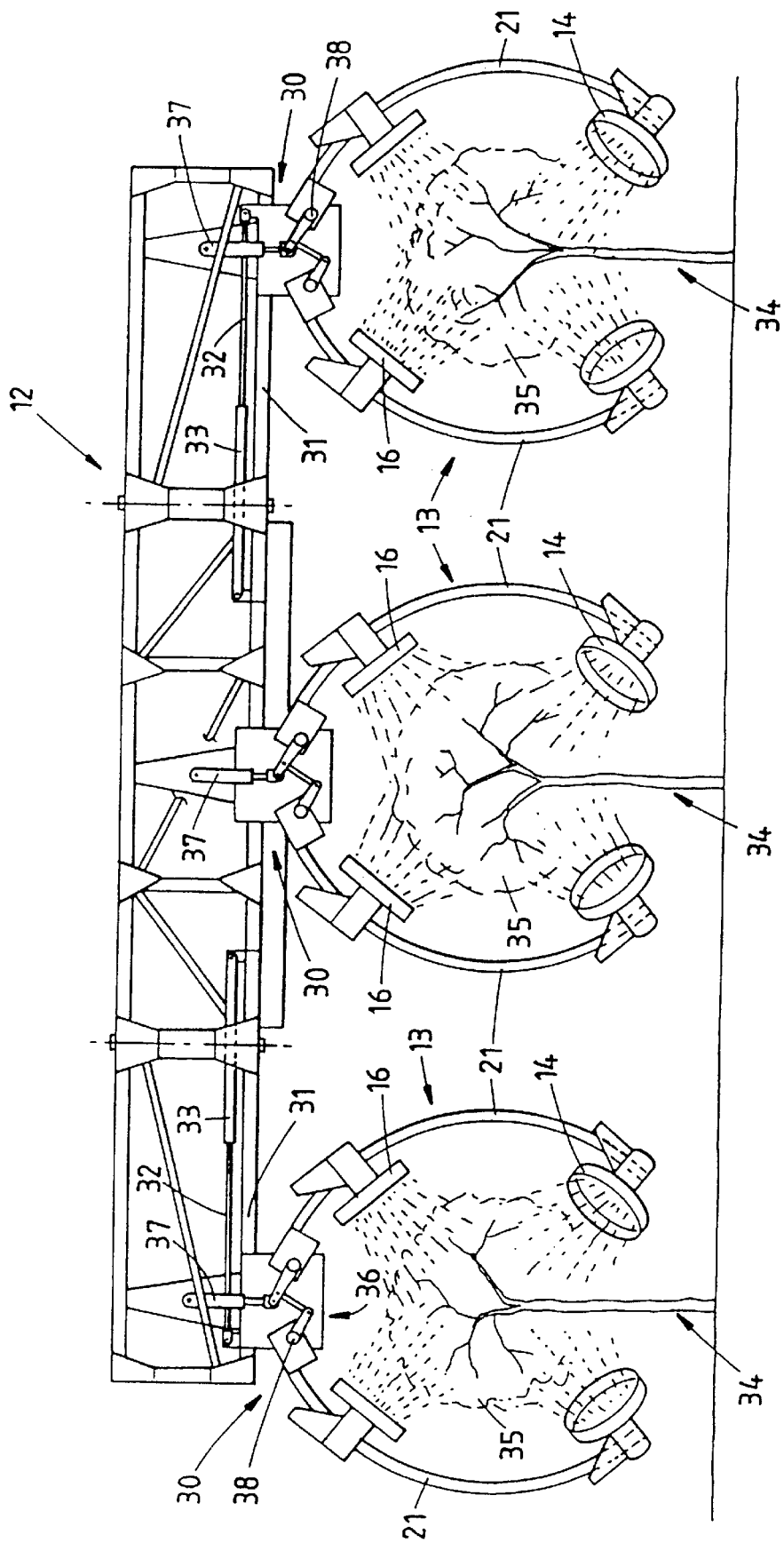
FIG. 3 is a representation of three spraying sub-assemblies carried on a bridge as viewed from the front of an over row tractor, FIG. 3 being a front elevation of the side elevation shown in FIG. 1.

FIG. 3 shows the mobile frame 12 being the form of a bridge which is also shown in FIG. 1, and each spraying sub-assembly 13 includes lower spray heads 14, upper spray heads 16 and an upper central spray head which is not illustrated in FIG. 3 for the purpose of clarity of the drawing. The spray heads are carried on the respective arms 21 as described previously, and arm 21 is illustrated as being curved to diverge downwardly away from the other arm of its pair at its upper end and converge downwardly towards the other arm of its pair at the lower ends of the arms to define a horseshoe shape, the upper spray head 16 being clamped to the upper ends of the arms 21 and the lower spray heads 14 to the lower ends.

FIG. 3 illustrates three suspension means all designated 30 from the bottom of the mobile frame 12 which suspend the respective spraying sub-assemblies 13, and FIG. 3 also shows how the ends of the mobile frame 12 are provided with guides 31 which guide slides 32 for movement towards or away from the ends of the mobile frame 12, and the two outer spraying sub-assemblies 13 depend from the slides 32 through the suspension means 30 while the inner one is fixed with respect to the mobile frame 12. Thus the hydraulic piston/cylinder assemblies 33 readily adjust the positions of the two outer spraying sub-assemblies 13 to vary those positions as the spacing between the rows of vines 34 varies, sometimes in the same traverse of the over row tractor 10 and sometimes as the over row tractor 10 traverses alternative rows of vines of different species, for example.

Not only does the space between the rows of vines 34 vary, but the canopies 35 also vary dimensionally, and FIG. 3 and FIG. 4 both illustrate a linkage mechanism 36 wherein a further hydraulic piston/cylinder assembly 37 can adjust each respective pair of arms 21 in opening or closing them about pivots 38. The upper end of each arm 21 is carried by a bearing block 41 which embodies a respective pivot 38, and each bearing block 41 has an extending lug 42, the lugs 42 being generally parallel and being joined together by a link 43, the arrangement being such that actuation of the hydraulic piston/cylinder assembly 37 will cause the arms to swivel further apart or closer together about their respective pivots 38.

In addition to the adjustment which can be achieved of the spacing between the adjacent spraying sub-assemblies 13, the adjustment of the spray heads 14 and 16 towards and away from the canopies 35 and the ability to reposition any or all of the upper spray heads 16 and the lower spray heads 14 on the arms 21, a further adjustment is required.

Figure 5B:
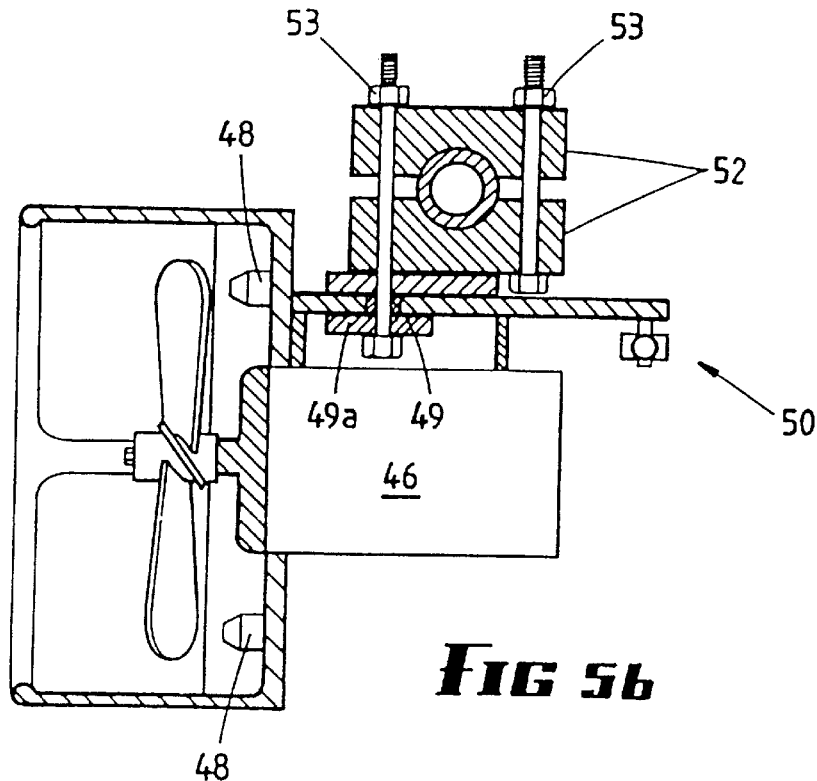
Figure 5A:
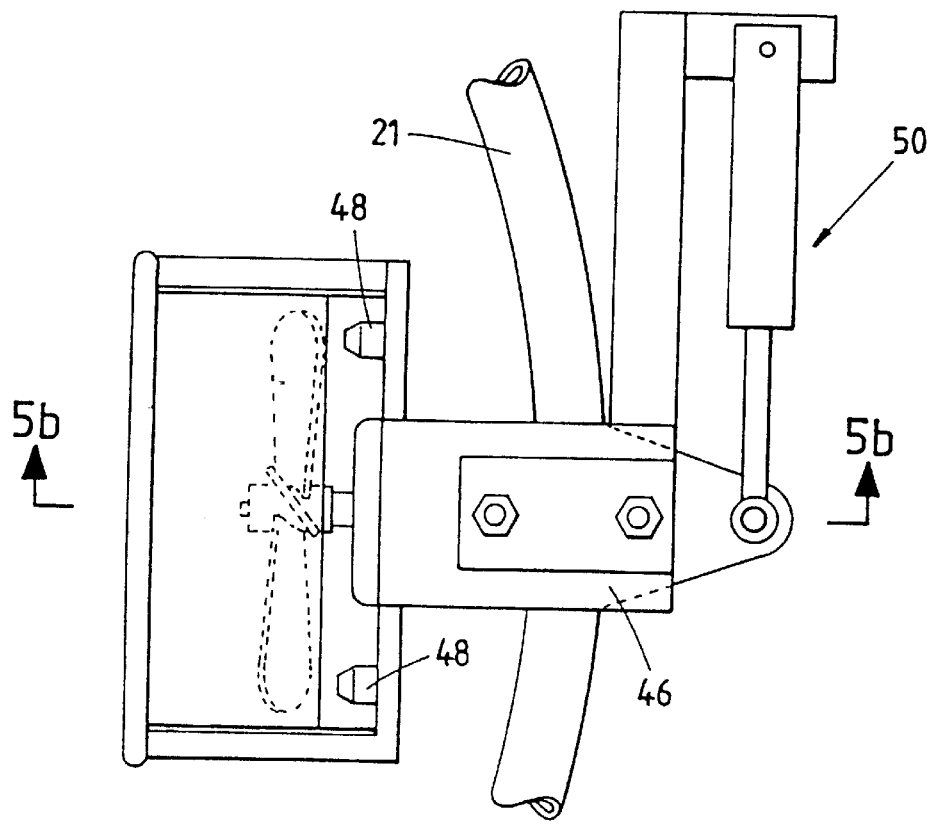
FIG. 5a is a fragmentary side elevation of a lower spray head and illustrating control of the "wrist movement" of the spray head.

FIGS. 5a and 5b detail a fragmentary side elevation of a lower spray head and illustrate control of the "wrist movement". The spray head comprises an electric motor 46 which is direct coupled to a fan 47 which will induce a flow of air which will in turn entrain spray from nozzles 48. A wrist type adjustment is required to vary the direction of the air and spray being impelled by fans 47 about the axis A—A through a swivel bearing arrangement 49 and 49a, and this is achieved by a hydraulic piston/cylinder assembly 50, herein called the "wrist adjustment cylinder". Further to that adjustment, there is a requirement for adjusting the spray heads 14, 16 and 17 to be at 90° of the direction of travel, or to be inclined thereto and that is achieved by adjustment of the clamp 52, but since that adjustment is only required very rarely, it is achieved by the relaxing and re-tightening of the clamping bolts 53. It is believed that the best results can be achieved by having the lower spray heads 14 pointing in the forward direction, and the upper spray heads 16 in a slightly rearward direction, while the upper central spray head 17 is located further rearward. This enables a displacement of air from the space within the canopy 35 before the outside of the canopy is subjected to spray coming from the upper spray heads. Since at approximately 9 km/h to 12 km/h, the sprayed area of a vine can be traversed in a little over 2 seconds of time, there is little chance for overspray to develop when the canopy is subject to at least four and possibly five streams of air with entrained spray, and the leaves of the canopy itself are subject to a lot of turbulence because of the turbulent flow of air and spray around them, and that turbulence also assists in limiting over spray.

As said above, it is desirable to carefully adjust the distance between the spray heads 14, 16 and 17 and the outer surface of the canopy, a distance of about 300 mm being regarded as very satisfactory. Furthermore, the arms 21 being of circular section tube enable not merely rotational but also sliding movement of the spray heads up and down the arms to best suit the conditions which are encountered in normal vineyard spraying.

The mobile frame 12 in the embodiment of FIGS. 3 and 4 is in effect a bridge which is centrally secured to the over row tractor 10 by securing bolts 56 (as detailed in FIG. 1), so that dismantling and removal or reassembling of the entire spraying equipment can be readily and simply achieved.

As shown, the air is being impelled by means of a separate fan and motor assembly on each spray head, but clearly use can be made on a central blower to blow air through ducts.

The method of using the equipment described above comprises primarily operating the two lower fans to direct the sprays entrained in the two lower air streams created by those fans to converge upwardly into a locality within the canopy from both sides with sufficient energy to displace the air from the canopy space and also to displace leaves from within the canopy in upward and outward directions. The upper fans are operated to cover the canopy with spray entrained in the upper air streams, and all the air streams are directed towards the space within the canopy so that they co-act and create a high degree of turbulence. This method of spraying and the resulting high degree of turbulence created has been found to significantly improve the effectiveness of the spraying process by providing a superior coverage of the target foliage with sprayed materials as compared with prior art systems known to the Applicant. Improved targeting of the spray materials to the target foliage results in a significant reduction in overspray. The overall result of these improvements is a dramatic reduction in the required spray materials for a given size of crop as compared with prior art systems which in turn results in beneficial financial and environmental effects.

It is thought to be desirable to first displace the air within the space beneath the canopy with spray before the upper sprays envelope the outer surface of the canopy, since not only is the wetting of the inner surfaces of leaves improved by the flow of air from the lower spray heads into the space beneath the canopy, without the force of air from the upper spray heads inhibiting free flow of air through the canopy from beneath, but also the degree of turbulence, both inside and outside the canopy is increased. In the event that the spraying takes place late in the season but before picking, the inwardly directed sprays from beneath the canopy will also impinge upon the fruit, and thereby improve protection against the various diseases such as downy mildew.

The equipment described above can be enhanced by various accessories. For example, the or each spraying sub-assembly may be provided with an overhanging deflector, effective to return upwardly moving droplets back to a canopy. Still further, a partly surrounding shroud can overlie the top and sides of the canopy or even separate shrouds for each individual fan and spray head assembly. In addition, although the adjustment of the angular positioning of the fans is detailed in this specification as being manual, enhancement of this facility to provide automatic adjustment of the angular positioning in accordance with the expansion or contraction of the spray sub-assemblies could be easily implemented.

The following is a brief summary of the electronic control system which is embodied in this invention to give control of many features of the spraying system.

DESCRIPTION OF FUNCTIONAL MODEL OF SPRAYING SYSTEM

Figure 6:
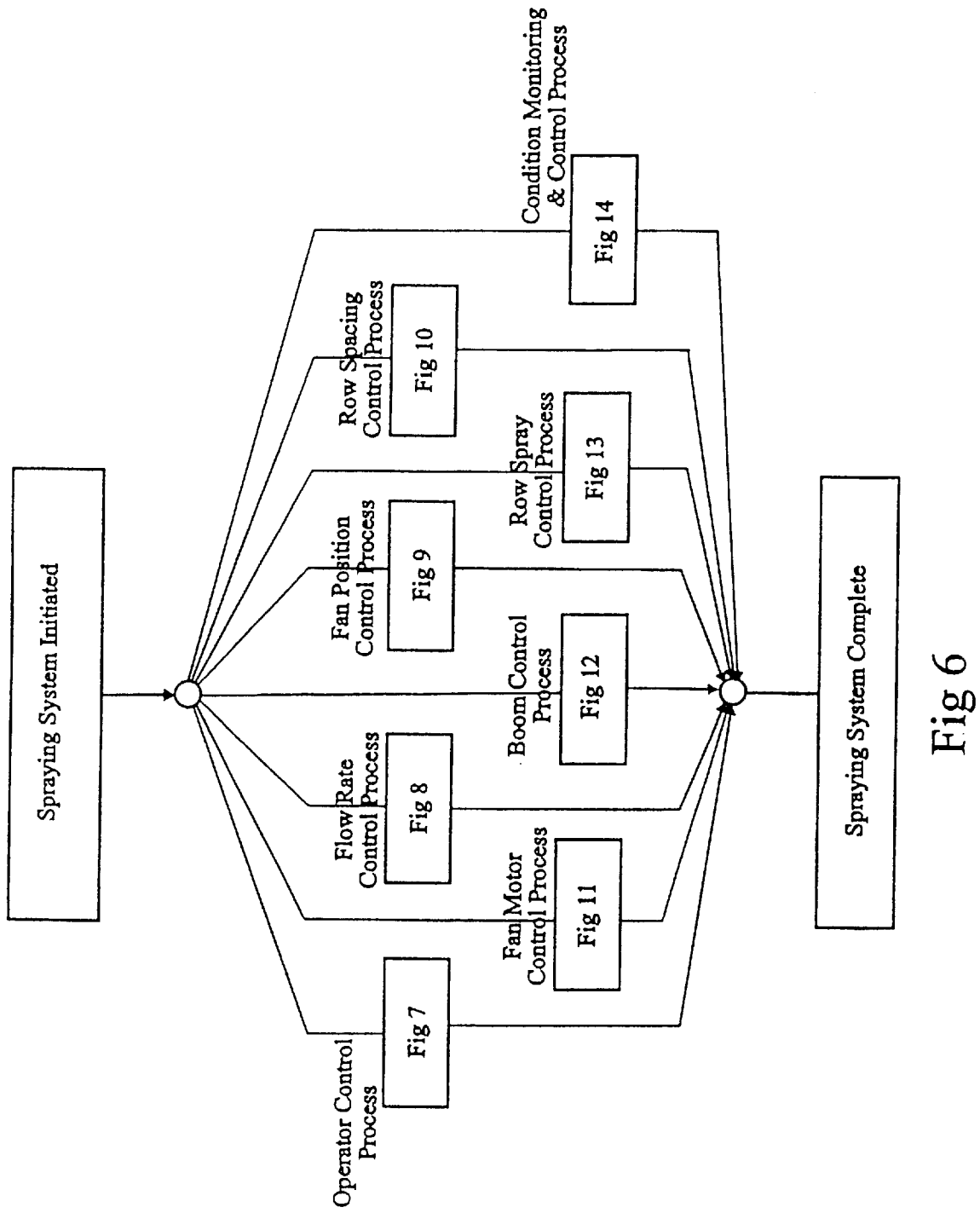
FIG. 6 shows the independent processes which form the spraying system.

The spraying system conceptually comprises eight independent processes that execute simultaneously. These eight independent processes are indicated in FIG. 6 as "Operator Control Process", "Flow Rate Control Process", "Fan Position Control Process", "Row Spacing Control Process", "Fan Motor Control Process", "Boom Control Process", "Row Spray Control Process" and "Condition Monitoring & Control Process". The subsequent FIGS. (7 to 14) detail the functions of each of these processes. Each of these processes will execute indefinitely as the operation of the spraying system is intended to occur indefinitely and will only be halted in the event of an operator shutting down the system or in the event of a system failure detected by the "Condition Monitoring & Control Process".

Each of the main processes communicate between functions via the use of messages (detailed by the use of round cornered boxes) which may have multiple sources and/or destinations. Messages may trigger a function to start execution and/or it may be the source of information which the receiving function will use at a later time. Indefinite loops that occur by default without evaluation of any criteria are annotated with the word "Loop".

As it would be appreciated by those skilled in the art, the physical architecture of the spraying system could be implemented with a variety of computational equipment configurations available from manufacturers of electronic control systems. The functional model of the spraying system described below is independent of any particular physical architecture and provides sufficient detail to a person skilled in the art to perform the invention with any physical architecture of their choice.

Each of the main processes detailed in FIG. 6 comprises its own initialisation stage wherein default parameters are implemented for that particular process. Upon the starting of the spraying system, each of these processes is initialised into an operational state and can continue execution with its default settings.

However, the "Operator Control Process" enables an operator to individually control each of the main processes thereby enabling the operator to effect changes to the default parameter settings.

The "Operator Control Process" as detailed in FIG. 7 comprises its own initialisation and default parameter setup stage. Subsequent to the initialisation stage the operator is presented with a menu of items from which the operator can choose a particular aspect of the spraying system that he wishes to adjust or control. The selection of the items from the menu system is most likely to be implemented by means of a touch sensitive liquid crystal display.

If the operator wishes to alter or adjust the currently active fan motors, selecting this particular item from the menu system causes execution to follow the path designated "p1". The function "select active fan motors" enables the operator to activate or de-activate individual fan motors on the spraying sub-assembly. Upon selecting a new configuration of active fan motors, a message is passed from this function to the "Fan Motor Control Process" designated by "A".

If the operator wishes to adjust the angular positioning of individual fan motors, selecting this item from the menu system causes execution to follow the path designated "p2". The adjustment of individual fan motor angular positions is performed by the operator viewing the individual fan motor as he manipulates the position controls for the fan motor. Upon completion of this function control is returned to the "select menu item function". In the preferred embodiment, the controls for angular positioning adjustments are common across sets of fans, and has been implemented such that all lower fans are commonly controlled and all middle fans also share a common control. In this way, the operator needs only to make a single adjustment for each set of fans.

The operator may choose to alter the current fan position adjustment mode from the default mode and upon so doing execution is direction along the path designated "p3". This particular function enables the operator to select either a manual or automatic fan position adjustment mode. The manual mode for fan position adjustment enables the operator to manually select an appropriate fan position in relation to the foliage to be sprayed. Having selected the manual mode the operator may make subsequent changes to the fan positions in relation to the foliage to be sprayed by executing this function at a later stage and making the appropriate manual adjustment. However, if the operator chooses the automatic mode, the "Fan Position Control Process" is activated and maintains the fan position relative to the foliage to be sprayed by automatic control. Depending upon the adjustment mode selected by the operator a message or messages are sent to the "Fan Position Control Process" as designated by "B". Again, upon completion of this function control is returned to the "Select menu item function".

A diagnostic mode is available to the operator and upon selection of this mode execution is directed along the path designated "p4". The diagnostic mode enables the operator to view and monitor results from various measurement systems and transducers placed throughout the spraying and electrical system. Upon completion of this function control is again returned to the menu item selection function.

The operator may also choose to alter the spray operating mode and upon so doing causes execution to be directed along the path designated "p5". The operator may choose one of four spray operating modes comprising either a fully manual mode wherein a fluid pressure regulator is adjusted by hand, a constant flow rate, a proportional flow rate in relation to the speed of the vehicle, or a proportional flow rate in relation to the vehicle speed and the positioning of the spraying arms (hence spraying being proportional to the foliage canopy size). Having selected a particular mode, a message is sent to the "Flow Rate Control Process" designated by "C". If the operator selects a constant flow rate operating mode then this message will also contain the desired flow rate. Upon completion of this function control will return to the menu item selection function.

The operator is also provided with control in relation to which particular rows are actively spraying at any point in time. If the operator chooses to make a change in this regard execution is directed along the path designated by "p6". Upon selecting which particular rows are to be actively spraying, a message is sent to the "Row Spray Control Process" designated by "D". Upon completion of this function control is then returned to the "Select menu item function".

The operator is provided with the ability to enter an initial liquid volume contained in the spraying tank and upon selecting this option causes execution to be directed along the path designated "p7". If the operator chooses to enter a value representing the volume of liquid contained in the spraying tank at the start of spraying operations, the system provides an estimate of the remaining liquid in the tank during operation of the spraying system. Once again, control is then returned to the "Select menu item function".

In the preferred embodiment, the two outer spraying sub-assemblies are hinged on the mobile frame enabling these sub-assemblies to be folded or closed when non-operational. In their closed position, the "booms" rest adjacent to the over row tractor enabling ease of transport of the spraying system. The operator is also provided with the ability to manually control the boom positions and upon electing this option the operator causes execution to be directed along the path designated by "p8". This particular function enables the operator to open or close individual booms. Upon making an appropriate selection, a message is sent to the "Boom Control Process" designated by "E". Upon completion of the function control is then returned to the "Select menu item function".

The operator is also provided control in relation to the row spacing control mode. Upon requesting a change in this regard execution is directed along the path designated by "p9". The operator may select either a manual or automatic row spacing control mode. Having made a selection an appropriate message is sent to the "Row Spacing Control Process" designated by "F". If the operator selects the manual row spacing control mode he is then provided with the ability to make manual adjustments to the row spacing. Upon completion of this function control is then returned to the "Select menu item function".

The operator is also provided with the ability to indicate to the system the starting and the completion of a row for spraying. In addition the operator is provided with a shut down facility. In selecting any of these options execution is directed along the path designated "p10". Upon selecting from the menu system either the start or complete row indicator and/or the shut down option, appropriate messages are sent to the "Fan Motor Control Process", the "Boom Control Process" and the "Row Spray Control Process" designated by "G". Under normal operating conditions upon initialisation and start of the spraying system the "Row Spray Control Process" default setting is set to spray all three rows, the "Boom Control Process" default setting is set to open both booms and the "Fan Motor Control Process" defaults to a sequential start up of each fan motor on each frame sub-assembly. Upon selecting the start row indication a message is sent to the "Fan Motor Control Process" to activate selected fan motors if they are currently not operational. At the same time a message is sent to the "Boom Control Process" to open the booms. Once the fan motors are started and the booms are opened a message is sent to the "Row Spray Control Process" to open the appropriate row valves enabling fluid flow from the storage tank to the individual spray outlets. Upon selecting the complete row indicator, a message is sent to the "Row Spray Control Process" to close all row valves thereby stopping all spray heads from spraying and at the same time a message is sent to the "Boom Control Process" to close both booms. Between the completion of one row and the commencement of another row, the fan motors are left running while spraying is discontinued and the booms are closed. However, upon selecting the shut down option the same message is sent to the "Row Spray Control Process" and the "Boom Control Process" as is sent for the complete row indication but in addition a message is also sent to the "Fan Motor Control Process" de-activating all fans. Upon completion of this function control is returned to the "Select menu item function".

The select menu item function also receives messages from the condition monitoring and control process. These messages are to indicate to the operator alarm conditions and are designated by "J". At any time the operator can select the alarm monitor and control function thereby causing execution to be directed along the path designated "p11". This function enables the operator to view more specific details of the alarm message from the condition monitoring and control process and to manually override or cancel the alarm. In either case a message is sent from this function to the condition monitoring and control process designated by "H". Upon completion of this function control is returned to the "Select menu item function".

FIG. 8 details the "Flow Rate Control Process". In the preferred embodiment, the flow rate of dispensed materials from the spray heads is controlled by means of adjustments to the pressure maintained in the conduit connecting the individual spray heads. The fluid pump which transfers the fluid from the storage tank to the spray heads is a hydraulic pump which operates at a predetermined flow rate. The pressure in the conduits is adjusted by means of an electrically controlled pressure regulator which in turn controls the flow rate of the fluid emanating from the spray heads. Upon initialisation of the spraying system the "Flow Rate Control Process" enters an initialisation and default parameter setup stage. Upon completion of the initialisation stage the process enters the "Read Incoming Message Buffer" function. This function acts to read any awaiting incoming messages including messages from the "Operator Control Process" and flow meter readings from external transducers. The "Flow Rate Control Process" defaults to a constant flow rate setting and upon the first execution of the read incoming message buffer function if no messages are received from the "Operator Control Process" execution progresses along the path designated "const". Having established a constant flow rate control is returned once again to the "Read Incoming Message Buffer" function. Again, if no messages have been received from the "Operator Control Process", execution is directed along the path designated "no messages". This causes the process to execute the "compare target flow rate to actual rate and perform adjustment" function wherein any adjustments required are made to the measured flow rate of the fluid to the spray heads. Upon completion of this function control is then returned to the "read incoming message buffer" function. Assuming that no messages have subsequently been received from the "Operator Control Process" execution is again directed down the path designated "no messages" wherein a target flow rate is compared to an actual flow rate as indicated from transducers through the flow meter readings messages received by the incoming message buffer. This sequence of events continues until a message is received from the "Operator Control Process". Messages may be sent from the "Operator Control Process" to select an alternate spray operating mode. Apart from the constant flow rate mode, the operator may also select a proportional flow rate control wherein the flow rate is controlled according to the speed of the over row tractor, or a proportional flow rate control mode wherein the flow rate is controlled according to both the speed of the over row tractor and the extension or contraction of the spray arm (and hence the foliage canopy size). If the operator selects either of these modes execution is directed along the appropriate path either "prop1" or "prop2". Upon completion of these functions a proportional flow rate control system is activated and control is then returned to the "read incoming message buffer" function. Again, whilst no further messages are received from the "Operator Control Process" execution continues to loop through the "compare target flow rate to actual rate and perform adjustment" function and adjustments to the flow rate are performed in accordance with the flow meter readings received from external transducers. In addition to each the flow rate control modes identified above, the operator may also select a completely manual mode wherein adjustments to the flow rate are made by hand. In selecting this option, a message is sent from the "Operator Control Process" to the "Flow Rate Control Process" to effectively halt the "Flow Rate Control Process" from further processing. This enables the operator to make manual adjustments to the flow rate which may be required for maintenance or during a diagnostics session for example. Apart from the completely manual option, the "Flow Rate Control Process" continues indefinitely until the spraying system is completely shut down.

The "Fan Position Control Process" controls the adjustment of the spraying arms to control the distance between the spray heads and the foliage to be sprayed. Upon initialisation of the spraying system this process enters an initialisation and default parameter setup stage. Upon completion of the initialisation stage the process enters the "read incoming message buffer" function. The manual option is the default setting for the "Fan Position Control Process" and upon entering the "read incoming message buffer" function execution of this process halts and awaits a message to be received from the "Operator Control Process" designated "B". The operator can choose to manually adjust the spraying arms thereby causing execution to be directed along the path designated "manual". Upon completion of adjusting the fan positioning relative to the foliage to be sprayed, control is returned to the "read incoming message buffer" function. However, if the operator selects the automatic mode, execution is directed along the path designated "automatic" and the "establish automatic control of fan position" function is executed. Having activated the automatic control system for positioning of the spraying arms, the target position of the spraying arms is compared to the actual position based upon the canopy size readings passed to the "Fan Position Control Process" from external transducers. Appropriate positioning adjustments are performed if required. Upon completion of these functions control is once again returned to the "read incoming message buffer" function. If the automatic mode has been selected and canopy size readings are received from the external transducers then process execution continues down the path designated "automatic". This sequence of events will continue until a message is received from the "Operator Control Process" halting the continuance of the automatic mode and selecting the manual positioning mode.

FIG. 10 details the functions of the "Row Spacing Control Process". Again, upon initialisation of the spraying system this process enters an initialisation and default parameter setup stage. Upon completion of this stage the process enters the "Read Incoming Message Buffer" function. This process is analogous in its execution to the "Fan Position Control Process". The "Row Spacing Control Process" controls the adjustment of the spraying sub-assemblies to control the distance between the spraying sub-assemblies according to the variation in row spacing of the crop. Upon initialisation of the spraying system this process enters an initialisation and default parameter setup stage. Upon completion of the initialisation stage the process enters the "read incoming message buffer" function. The manual option is the default setting for the "Row Spacing Control Process" and upon entering the "read incoming message buffer" function execution of this process halts and awaits a message to be received from the "Operator Control Process" designated "F". The operator can choose to manually adjust the spraying sub-assemblies thereby causing execution to be directed along the path designated "manual". Upon completion of adjusting the sub-assemblies positioning relative to the foliage to be sprayed, control is returned to the "read incoming message buffer" function. However, if the operator selects the automatic mode, execution is directed along the path designated "automatic" and the "establish automatic control of row spacing" function is executed. Having activated the automatic control system for positioning of the spraying sub-assemblies, the target position of the spraying sub-assemblies is compared to the actual position based upon the row spacing readings passed to the "Row Spacing Control Process" from external transducers. Appropriate positioning adjustments are performed if required. Upon completion of these functions control is once again returned to the "read incoming message buffer". If the automatic mode has been selected and row spacing readings are received from the external transducers then process execution continues down the path designated "automatic". This sequence of events will continue until a message is received from the "Operator Control Process" halting the continuance of the automatic mode and selecting the manual positioning mode.

FIG. 11 details the function of the "Fan Motor Control Process". Upon start up of the spraying system the process enters an initialisation and default parameter setup stage. Upon completion of this stage the process then enters an indefinite loop wherein the process reads incoming messages and either enables or disables fan motors according to the received instructions. The "read incoming message buffer" function receives messages from either the "Operator Control Process" or the condition monitoring and control process. Message "A" is received from the "Operator Control Process" upon selection by the operator to manually enable or disable individual fan motors. Message "G" is also received from the "Operator Control Process" as part of the message sequence sent from that process as a result of the operator selecting the shut down option. Message "K" is received from the condition monitoring and control process upon alarm activation requiring all fan motors to be shut down. FIG. 12 details the functions of the "Boom Control Process". Upon initialisation of the spraying system this process enters an initialisation and default parameter setup stage. Upon completion of this stage the process enters an indefinite loop wherein incoming messages are received and the booms are either opened or closed according to the instructions received by those messages. This process is analogous to the "Fan Motor Control Process". The "read incoming message buffer" function receives messages from the "Operator Control Process". Message "E" is sent from the "Operator Control Process" upon selection by the operator of the "adjust boom position" function. Message "G" is also received from the "Operator Control Process" and is sent as part of the message sequence associated with the operator selecting the complete row indication and shut-down option.

FIG. 13 details the functions of the "Row Spray Control Process". Upon initialisation of the spraying system this process enters an initialisation and default parameter setup stage. Upon completion of this stage the process enters an indefinite loop wherein messages are received from both the "Operator Control Process" and the condition monitoring and control process and the instructions received from those messages are effected in either the opening or closing of valves to enable or disable the flow of fluid to the spray heads of a set of spraying arms. Message "D" is received from the "Operator Control Process" upon the operator executing the "select spraying rows" function. Message "G" is also received from the "Operator Control Process" as part of the message sequence sent resulting from the operator selecting either the complete row indication or selecting the shut down option. Message "L" is received from the condition monitoring and control process and this message is sent on the basis of an alarm condition or malfunction and requests the "Row Spray Control Process" to close all valves.

FIG. 14 details the functions of the "Condition Monitoring & Control Process". Upon initialisation of the spraying system this process enters an initialisation and default parameter setup stage. Upon completion of this stage the process executes two separate independent sub-processes which operate concurrently. Sub-process 1 acts to receive inputs from the "Operator Control Process" designated by "H" wherein the operator can send messages to the "Condition Monitoring & Control Process" to either set or release a manual override of an alarm condition. If the operator wishes to set the manual override for an alarm the "Set to Manual Override Status" function is executed wherein a message is sent to sub-process 2 indicating the particular alarm for which the operator wishes to activate the manual override. However, if the operator wishes to release a previously set override, the process then executes the "De-activate Alarm" function which will de-activate the alarm condition. The "De-activate Alarm" function sends a message to the "Operator Control Process" to indicate the alarm de-activation. Sub-process 2 acts to receive alarm inputs from external sensors and messages from sub-process 1 and to process these inputs accordingly. In the preferred embodiment alarm condition sensors are provided for sensing fan motor current, collision of the spraying subassemblies with an object, alternator temperature, engine speed, spraying pump speed, spraying pressure and emergency stop. If a sensor input is out of a predetermined safe operating range as determined by the received external sensor input and a manual override has not been set for this alarm, then execution of the sub-process proceeds along the path designated "out of range (manual override released)" wherein the "Activate Alarm" function is executed. Upon execution of this function, messages are sent to the "Operator Control Process" to alert the operator, the "Fan Motor Control Process" to perform a shutdown of the fan motors and the "Row Spray Control Process" to close the row valves and halt the flow of fluid to the spray heads. Alternatively, if a manual override has been set for the particular alarm, then the alarm condition is not processed. If an external sensor subsequently indicates that a measured parameter is now within its predetermined operating range, then execution proceeds along the path designated "in range" and the "De-activate Alarm" function is executed. As for sub-process1, upon execution of this function, a message is sent to the "Operator Control Process".

I claim:

1. A method spraying a growing plant having a foliage canopy comprising:

a) operating two lower fans on a mobile frame situated generally below said canopy to direct sprays entrained in two lower air streams created by said lower fans to converge upwardly into a locality within said canopy from opposite sides thereof with sufficient energy to displace at least some leaves from within said canopy in upward and outward directions and expand said canopy;

b) operating two upper fans also on said frame situated generally above said canopy to direct spray entrained in upper airstreams created by said upper fans to converge downwardly over, into and partly through said canopy from the opposite sides therefor to co-act with said upwardly directed airstreams at said locality within said canopy and thereby create turbulence both within said locality and around said canopy;

c) operating a single fan also on said frame located above said canopy and rearwardly of said lower and upper fans to direct spray downwardly into said canopy to ensure further continued turbulence, and d) transporting said frame past said plant during said spraying operation.

2. A method according to claim 1, wherein said mobile frame is a bridge, and said lower and upper fans are arranged in three separate spraying sub-assemblies mounted on respective frames which are themselves mounted on said bridge;

comprising mounting said bridge intermediate its ends on an over row tractor, locating a central one of said spraying sub-assemblies centrally with respect to the over the row tractor and the other two of said spraying assemblies laterally spaced therefrom, one on each side of said central sub-assembly, and spraying canopies of three separate rows of plants simultaneously while driving said tractor over a central row of the three rows.

3. Spray apparatus for spraying a row of crops of plants having a foliage canopy, comprising:

a mobile frame;

a spraying sub-assembly having a pair of spaced arms carried by and depending from said mobile frame, two lower fan spray heads, fastening means fastening said lower fan spray heads with respect to lower ends of said spaced arms adjustable for both position and direction of spray when issuing from said fan spray heads, wherein said spaced arms are curved to diverge downwardly away from each other at their upper ends and converge downwardly towards each other at their lower ends to define a horseshoe shape, and wherein there are two upper fan spray heads, said fastening means securing said upper fan spray heads to the upper portions of respective said arms and the lower fan spray heads to the lower ends of respective said arms, and wherein said spraying sub-assembly further includes a central further upper fan spray head, said further upper fan spray head being mounted on said mobile frame centrally above the said canopy and rearwardly of said upper and lower spray heads.

4. Spray apparatus as defined in claim 1, wherein the arms are curved to diverge downwardly away from each other at their upper ends, and to converge downwardly towards each other at their lower ends.

5. Spray apparatus according to claim 1 and including fastening means to adjustably secure said fan spray heads to said arms both for position on said arms and direction about a first axis, said fan spray heads each comprising a motor, fan and spray nozzle assembly, a swivel between said fastening means and said motor, fan and spray nozzle assembly providing a second adjustment means for direction about a second axis at right angles to the first axis.

6. Spray apparatus according to claim 5 and including a piston/cylinder assembly for providing adjustment means co-acting between said fastening means and said fan, motor spray nozzle assembly for effecting direction control of said second adjustment means.

7. Spraying apparatus according to claim 3, wherein said mobile frame comprises frame members, and attachment means for attaching said frame to a vehicle.

8. Spray apparatus according to claim 3, wherein said mobile frame is elongate, and comprises attachment means for attaching said elongate frame transversely to an over row tractor, there being a pair of guides extending towards the center of said elongate frame from its ends, a pair of slides slidable along respective said guides, piston/cylinder assemblies co-acting between respective said slides and said elongate frame to control positions of said slides, three suspension means on said frame, and intermediate of said three suspension means being central and fast with said frame, the other two said suspension means being carried by respective said slides, and three said spraying sub-assemblies suspended from respective said suspension means.

9. Spray apparatus according to claim 8, further comprising a bearing at the upper end of each said arm journalling said arm to be suspended, movement from said suspension means such that, upon collision with an object, said arm can swivel upwardly and rearwardly.

10. Spray apparatus according to claim 8, wherein each said suspension means comprises a generally vertically oriented tilt control piston/cylinder assembly, pivot means supporting the upper end of each respective said arm of each said sub-assembly to a respective said suspension means, each said arm having an extension lug extending beyond its upper end, a link joining extension lugs of adjacent upper arm ends of each respective said sub-assembly, each said tilt control piston/cylinder assembly co-acting between a said suspension means and a said extension lug, the configuration being such that actuation of a said tilt control piston/cylinder controls tilt of said extension lugs to which it is connected and thereby the space between said arms.

11. Spray apparatus according to claim 10, further comprising an electronic control means, electrically actuated control means for each said generally vertically oriented tilt control piston/cylinder and foliage canopy sensing transducer, wherein said foliage canopy sensing transducer is affixed to said mobile frame providing varying electrical signals according to the distance between said sensing transducer and said foliage canopy, said sensing transducer being electrically coupled to said electronic control means which in turn receives said varying electrical signals from said sensing transducer and provides appropriate electrical signals to said electrically actuated control means of each tilt control piston/cylinder, each said electrically actuated control means being electrically coupled to said electronic control means, to effect adjustment of said space between said arms in accordance with sensed foliage canopy size.

12. Spray apparatus according to claim 11, wherein said electronic control means comprises a programmable logic controller.

13. Spray apparatus according to claim 11, wherein said electrically controlled flow rate means comprises an electrically controlled pressure regulator.

14. Spray apparatus according to claim 11, further comprising a fluid pump, fluid flow transducers and electrically controlled flow rate means all in electrical communication with said electronic control means, said fluid pump further being in fluid communication with said spray heads and providing a flow of fluid from a fluid storage tank to said spray heads, wherein said electronic control means receives electrical signals from said fluid flow transducers and in combination with said received signals from said sensing transducer, provides appropriate electrical signals to said electrically controlled flow rate means to control the flow of said fluid from said storage tank to said spray heads in accordance with said sensed foliage canopy size.

15. Spray apparatus according to claim 14, wherein said electronic control means comprises a programmable logic controller.

16. Spray apparatus according to claim 10, further comprising an electronic control means, electrically actuated control means for each said piston/cylinder assembly co-acting between respective said slides and said elongate frame and foliage canopy sensing transducer, wherein said foliage canopy sensing transducer is affixed to said mobile frame providing varying electrical signals according to the distance between said sensing transducer and said foliage canopy, said sensing transducer being electrically coupled to said electronic control means which in turn receives said varying electrical signals from said sensing transducer and provides appropriate electrical signals to said electrically actuated control means of each piston/cylinder assembly, each said electrically actuated control means being electrically coupled to said electronic control means, to effect adjustment of said slides.

17. Spray apparatus according to claim 16, wherein said electronic control means comprises a programmable logic controller.

18. Spray apparatus according to claim 16, wherein said electrically controlled flow rate means comprises an electrically controlled pressure regulator.

* * * * *